United States Patent [19]

Nikolic et al.

[11] 3,933,975
[45] Jan. 20, 1976

[54] NICKEL-COBALT SEPARATION

[75] Inventors: Cvetko B. Nikolic; Weldon P. Zundel, both of Golden; Robert S. Rickard, Lakewood, all of Colo.

[73] Assignee: Amax Inc., New York, N.Y.

[22] Filed: Feb. 8, 1974

[21] Appl. No.: 441,179

[52] U.S. Cl. ............... 423/139; 423/144; 423/145; 423/150
[51] Int. Cl.² .................. C01G 53/06; C01G 51/00
[58] Field of Search ........... 423/139, 144, 143, 145, 423/150, 592; 75/103, 108, 119

[56] References Cited
UNITED STATES PATENTS

| | | | |
|---|---|---|---|
| 466,495 | 1/1892 | Herrenschmidt | 423/592 |
| 2,647,820 | 8/1953 | Forward | 75/108 |
| 2,767,055 | 10/1956 | Schaufelberger | 423/145 |
| 2,845,333 | 7/1958 | Schaufelberger | 423/592 |
| 3,003,866 | 10/1961 | Mattano et al. | 423/139 |
| 3,728,105 | 4/1973 | Skarko | 75/119 |
| 3,751,558 | 8/1973 | Crnojevich et al. | 423/144 |

Primary Examiner—Oscar R. Vertiz
Assistant Examiner—Brian E. Hearn
Attorney, Agent, or Firm—Kasper T. Serijan; Eugene J. Kalil

[57] ABSTRACT

A method is provided for separating nickel and cobalt from a cobalt-nickel precipitate, the cobalt being in the cobaltic state. The method comprises dissolving the precipitate in an ammonium sulfate solution containing $NH_3$, acidifying the solution to a pH of about 1.5 to 3.0 and then cooling the solution to produce a nickel-ammonium sulfate precipitate highly enriched in nickel. The precipitate is separated from the solution and the solution passed through an ion exchange column selective to the removal of nickel, the solution remaining containing said cobalt substantially free of nickel, the cobalt solution being then sent to cobalt recovery.

4 Claims, 1 Drawing Figure

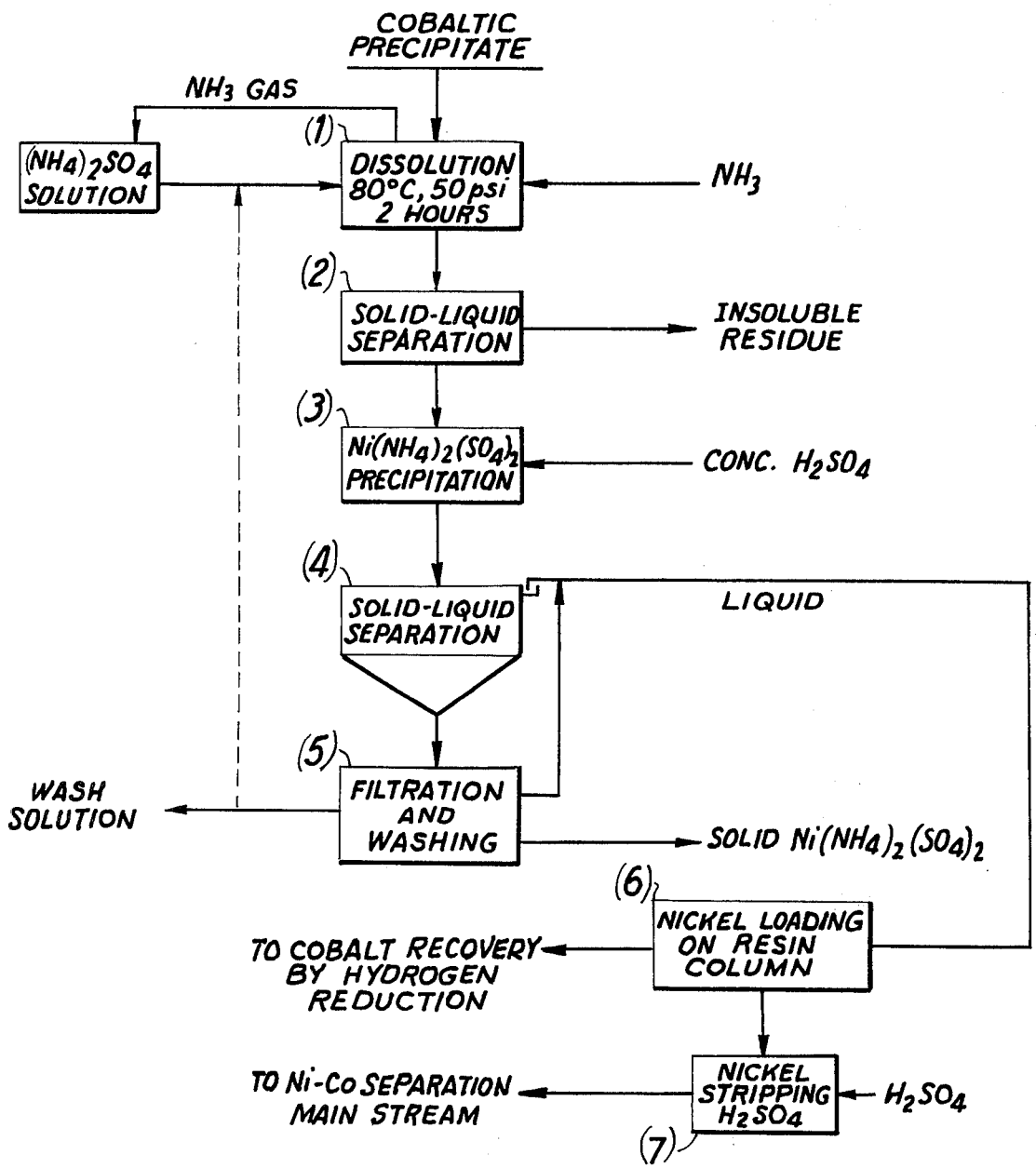

3,933,975

NICKEL-COBALT SEPARATION

This invention relates to the hydrometallurgy of nickel and cobalt and, in particular, to an improved method for nickel-cobalt separation from materials containing nickel and cobalt in which the cobalt exists in the cobaltic state ($Co^{+3}$). The method is particularly applicable to the treatment of cobaltic hydroxide precipitates produced as a by-product in the hydrometallurgical treatment of nickel ores or oxidized sulfide concentrates.

BACKGROUND OF THE INVENTION

Nickel and cobalt are generally found together in natural-occurring minerals and, because conventional ore dressing methods do not effect a separation of the two, both metals generally appear together in solutions resulting from the leaching of nickel and cobalt-containing materials, such as leached oxide ores, sulfide concentrates and the like.

In recent years, several hydrometallurgical methods have been proposed for the recovery of nickel and/or cobalt from lateritic limonitic ores. One method, in particular, resides in using aqueous sulfuric acid as the leachant at high temperature under elevated pressure, the raw ore being prepared in a finely divided state, then forming a slurry thereof at about 10 percent to 20 percent solids which is thereafter concentrated by settling and decanting in thickeners to produce an underflow having a concentration of about 30 percent to 50 percent solids. The concentrated slurry is heated in an autoclave by means of direct high pressure steam to a high temperature at which the leaching or other recovery treatment is carried out, usually above 400°F (205°C), e.g. about 475°F (246°C), at a pressure of about 525 psig in the presence of sulfuric acid to solubilize the nickel and cobalt present in the slurried ore. Following leaching in the autoclave, the leached pulp is cooled and preferably washed by countercurrent decantation and the resulting acid leach liquor then treated with a neutralizing agent [$Mg(OH)_2$, coral mud or the like] to raise the pH to, for example, 2.5 to 2.8 for the sulfide precipitation of nickel and cobalt. The leach liquor is brought to a temperature of about 250°F (122°C) and the nickel and cobalt precipitated as sulfides with $H_2S$ at pressures of up to about 150 psig, using nickel sulfide as seed material.

The sulfide precipitate is washed and thickened to about 65 percent solids and then oxidized at about 350°F (177°C) and a pressure of about 700 psig in an autoclave in 1 percent sulfuric acid. Ammonia is added as a neutralizing agent to the nickel-cobalt solution to raise the pH to a level (e.g. 5.3), using air as an oxidant, to precipitate any iron, aluminum or chromium carried over as an impurity during leaching. After separating the solution from the precipitate, any copper, lead or zinc present therein is removed by precipitation as a sulfide, using $H_2S$ as the precipitant, the solution being first adjusted with acid to lower the pH to about 1.5. The sulfide precipitate is then separated from the solution and the solution adjusted with ammonia to prepare it for the recovery of metallic nickel. The adjusted nickel feed solution containing about 40 to 50 grams per liter of nickel and some cobalt is reduced with hydrogen in an autoclave at about 375°F (190°C) and 650 psig using nickel powder as seed material, the barren liquor remaining going to cobalt recovery using known methods. However, some of the cobalt appears in the reduced nickel product.

Among the methods proposed and/or commercially used for separating cobalt from nickel is the method of separating cobalt from aqueous nickel-cobalt sulfate solutions by means of nickelic hydroxide, and the subsequent separation of cobalt from nickel in the resulting precipitate by means of the pentammine process described in U.S. Pat. Nos. 2,767,053 and 2,767,054, the cobalt in the precipitate being in the cobaltic state.

The cobaltic precipitate which also contains nickel is converted to cobaltic pentammine and nickelous ammine by adding an amount of ammonia sufficient to provide 5 mols $NH_3$ for each mol of cobaltic ion and 5 mols of $NH_3$ for each mol of nickelous ion. The solution is oxidized with oxygen and then acidified with sulfuric acid to a pH of at least 4 to produce a nickel-bearing precipitate in the form of a nickel-ammonium double salt, the double salt being formed in a crystallizer.

While the foregoing technique is useful in the extraction and recovery of cobalt from mainstream nickel-cobalt sulfate solutions, it has certain disadvantages. For one thing, the cost of reagents for forming the pentammine is high. For another, the solutions generally require oxygenation in order to inhibit the reducing effect of sulfuric acid on cobaltic ions, since cobaltic ions are essential in carrying out the pentammine process.

We have discovered an improved method for treating cobaltic precipitates, wherein dissolution of the cobaltic precipitate is effected quickly and completely by utilizing residual liquor from the ammonium sulfate crystallizer.

OBJECT OF THE INVENTION

It is an object of this invention to provide an improved process for separating cobalt from nickel values of various nickel-cobalt bearing materials, e.g. nickel and cobalt-bearing sulfate solutions.

Another object is to provide a process involving the separation of nickel from cobalt and produce a nickel product very low in cobalt content, with nickel-to-cobalt ratios in the product of preferably at least 1000:1 and ranging up to 2000:1 and higher.

These and other objects will more clearly appear when taken in conjunction with the following disclosure and the accompanying drawing which depicts a flow sheet illustrating one embodiment for carrying out the invention.

STATEMENT OF THE INVENTION

Broadly stated, the invention provides a method of separating nickel and cobalt from a cobalt-nickel precipitate with the cobalt in the cobaltic state, the method comprising dissolving the precipitate in an ammonium sulfate solution containing at least about 100 grams per liter of $(NH_4)_2SO_4$ (e.g. 100 to 450 grams per liter) and at least about 50 grams per liter of $NH_3$ (e.g. 50 to 170 grams per liter) at a temperature ranging from about 80°C to 120°C, under a pressure of at least about 20 psig, acidifying the solution to a pH of about 1.5 to 3.0 and cooling the solution to produce a nickel-ammonium sulfate precipitate enriched in nickel, separating the precipitate from said solution, passing said solution through an ion exchange column selective to the removal of nickel, thereby leaving a solution enriched in said cobalt, and then passing said solution to cobalt recovery.

The cobaltic precipitate is produced as a by-product in the treatment of nickel-cobalt sulfate solutions obtained from the selective leaching of nickel and cobalt-containing materials, such as oxide ores, roasted sulfide concentrates, and the like. As a result of the leaching of such materials, a mainstream nickel-cobalt sulfate solution is produced in which the nickel-to-cobalt ratio may range from about 5:1 to about 200:1. In producing the cobaltic precipitate as a by-product, an aliquot portion of said nickel-cobalt solution is taken from said mainstream, the aliquot portion containing enough nickel which, when oxidized to the nickelic state, is at least sufficient to oxidize subsequently the cobalt in the mainstream to the cobaltic state. The nickel is then precipitated from said aliquot portion as a nickelous precipitate by the addition of a precipitating agent selected from the group consisting of a mixture of $CO_2$ and $NH_3$, and $NH_3$ alone, the temperature of precipitation with $NH_3$ alone being over 50°C, and the nickelous precipitate oxidized to the nickelic state which is separated from the solution and contacted with the mainstream solution for a time sufficient to oxidize cobaltous ions in the mainstream solution to the cobaltic state and thus precipitate the cobalt from solution and reduce the nickelic ion to the nickelous state, the temperature of oxidation being over about 50°C, whereby the nickel in the mainstream solution is enriched substantially relative to the cobalt to provide a nickel:cobalt ratio in said solution of over 2000:1. The precipitate generally contains 25 percent to 45 percent nickel and 20 percent to 5 percent cobalt, the ratio of cobalt-to-nickel varying from 0.8:1 to 10:1.

In this connection, reference is made to copending application Ser. No. 441,180 filed of even date herewith in the names of the same inventors. The invention is applicable to any precipitate in which the cobalt is in the cobaltic state and the nickel in the nickelous state.

Generally, after both the nickel and cobalt are separated from the mainstream solution, the solution which is impoverished in the foregoing elements is sent to the ammonium sulfate crystallizer for the recovery of ammonium sulfate.

One of the economic advantages of the invention is that the residual liquor from the ammonium sulfate crystallizer can be directly used for the dissolution of the aforementioned cobaltic precipitate. The dissolution is fast and complete, iron being removed as a precipitate during the dissolution step.

In one embodiment, the cobaltic precipitate is dissolved in a solution containing 300 gpl $(NH_4)_2SO_4$ and 50 gpl $NH_3$ at 80°C in a closed vessel under pressure of about 20 psi. The dissolution is completed in 2 to 3 hours. Following dissolution, the solution with the dissolved precipitate is acidified to a pH of about 1.5 to 3 and a nickel double salt precipitate obtained following cooling in which the Ni:Co ratio is very high, for example, 2000:1. The remaining solution containing the dissolved cobalt and residual nickel (e.g. a Co:Ni ratio of 10:1 to 20:1) is then passed through a resin column which selectively removes the nickel, the remaining cobalt solution substantially free from nickel being thereafter treated by conventional methods for cobalt recovery.

The general process is illustrated in the accompanying drawing which depicts the cobaltic precipitate being subjected to dissolution at Step (1) using an ammonium sulfate solution and ammonia preferably containing 300 gpl of $(NH_4)_2SO_4$ and 50 gpl $NH_3$, the dissolution being carried out at preferably 80°C under a pressure of 50 psi gage for about 2 hours.

Insoluble residue, such as iron hydroxide, is removed at Step (2) and the solution remaining cooled and then acidified at Step (3) with concentrated $H_2SO_4$ to a pH level of about 1.5 to 3 to precipitate the double salt $(Ni(NH_4)_2(SO_4)_2$. The solution and precipitate are subjected to solid-liquid separation at Step (4), the overflow solution containing the cobalt and residual nickel going to a resin column at (6) for selectively removing the nickel, the double salt being filtered and washed at (5) to provide a high purity nickel product, the nickel absorbed by the resin being stripped at (7) by passing a sulfuric acid solution through the resin column. The stripped nickel solution is recycled to the mainstream solution for subsequent recovery.

It was observed in carrying out the process that the kinetics for the ammonia-ammonium sulfate dissolution of the cobaltic precipitate at room temperature is very slow but that it is very rapid at a temperature, for example, of about 80°C in a closed vessel at a pressure of about, for example, 50 psi gage, the reaction only taking about 2 hours. Tests confirmed that all of the cobalt in the solution remains in the cobaltic state. This is important as it enables the formation of a nickel double salt of fairly high purity.

As illustrative of the invention, the following example is given:

EXAMPLE 1

A cobaltic precipitate was produced by first oxidizing nickelous hydroxide to nickelic hydroxide using a solution of NaOCl as the oxidant. A typical solution is one containing 5.25 percent by weight of NaOCl. The oxidized precipitate was then introduced in a pilot plant solution containing nickel and cobalt sulfate to produce after about 1 hour at 90° to 95°C a cobaltic precipitate with a Ni:Co ratio of 3.5:1. This precipitate was then used in a series of dissolution tests containing 300 gpl $(NH_4)_2SO_4$ and various amounts of ammonia as shown in Table 1 below, the dissolution being carried out at about 80°C and a pressure of 50 psi gage:

TABLE 1

Dissolution of the Cobaltic Precipitate in $NH_3$-$(NH_4)_2SO_4$ Solution

| FEED | | | | | PRODUCT | | | |
|---|---|---|---|---|---|---|---|---|
| SOLIDS Precipitate | | | LIQUID | | | | | |
| Gms | % Ni | % Co | $H_2O$ mls | $NH_4OH$ mls | Vol. mls | Ni gpl | Co gpl | Time Hours |
| 22.0 | 35.6 | 10.0 | 450 | 50 | | 11.2 | 3.20 | 1 |
| | | | | | | 12.4 | 3.60 | 2 |
| | | | | | 590 | 12.7 | 3.95 | 3 |
| 23.2 | 35.2 | 10.4 | 400 | 100 | | 13.6 | 3.72 | 1 |
| | | | | | 578 | 14.8 | 3.98 | 2 |
| 22.4 | 35.2 | 10.4 | 350 | 150 | | 13.6 | 3.92 | 1 |
| | | | | | | | 4.00 | 2 |
| | | | | | 568 | | 4.11 | 3 |
| 18.7 | 36.8 | 12.8 | 300 | 200 | | 11.6 | 3.84 | 1 |
| | | | | | | 12.0 | 4.04 | 2 |
| | | | | | 550 | 12.6 | 4.35 | 3 |

As will be apparent from the table the dissolution was generally completed between 2 to 3 hours. It was noted that the dissolution of the cobalt precipitate in 300 gpl $(NH_4)_2SO_4$ with $NH_3$ was successful.

Following the dissolution of the precipitate, the solution which now contained 12.8 gpl Ni and 3.84 gpl Co was treated with concentrated sulfuric acid to precipitate the nickel double salt $(Ni(NH_4)_2(SO_4)_2$. A series of precipitations was conducted as shown in Table 2 below:

cobalt and nickel. Following an additional water wash, the nickel was then stripped or eluted with 4N $H_2SO_4$ Table 2

| Test No. | mls Conc. $H_2SO_4$ for 200 mls of Feed Soln | Final pH | Precipitation of $Ni(NH_4)_2(SO_4)_2$ | | | | | | | | |
|---|---|---|---|---|---|---|---|---|---|---|---|
| | | | FILTRATE | | | WASH SOLUTION | | | PRECIPITATE | | |
| | | | vol ml | Ni gpl | Co gpl | vol ml | Ni gpl | Co gpl | gms | % Ni | % Co |
| 1 | 13 | 1.4 | 201 | 0.30 | 3.80 | 50 | 10.4 | 0.014 | 11.5 | 17.2 | 0.014 |
| 2 | 11.5 | 2.0 | 198 | 0.32 | 3.88 | 50 | 10.0 | 0.013 | 12.5 | 16.0 | 0.008 |
| 3 | 11.5 | 2.7 | 201 | 0.34 | 3.80 | 50 | 10.4 | 0.015 | 12.0 | 16.4 | 0.010 |
| 4 | 11.7 | 2.9 | 200 | 0.34 | 3.84 | 50 | 10.8 | 0.013 | 11.6 | 16.8 | 0.008 |

During the addition of $H_2SO_4$, the solution temperatures increased to 65°C. As will be noted from the last column, the nickel double salt shows a very low cobalt content. The ratios of Ni:Co obtained are illustrated in Table 3 as follows:

Table 3

| Test No. | Ratio Ni:Co |
|---|---|
| 1 | 1200:1 |
| 2 | 2000:1 |
| 3 | 1640:1 |
| 4 | 2100:1 |

As will be observed, the Ni:Co ratio in the double salt exceeds 1000:1 and ranges up to and over 2000:1.

The solution remaining from the double salt precipitation containing the cobalt and some nickel is subjected to nickel removal by passing the solution through a column containing cationic type chelating ion exchange resin selective to the adsorption of nickel. The resin is an iminodiacetate cationic chelating resin in the ammonium form, typically commercially available resins being one sold under the trademark DOWEX A1, DOWEX XV-4045 and Amberlite XE-318. Tests have given extractions in which the effluent solutions contain nickel as low as 1 ppm. Following adsorption of nickel by the column, the nickel is removed by passing 4N $H_2SO_4$ through the column. After stripping of the nickel, the exchange resin is regenerated by passing 3 to 4 bed volumes of 20 percent $NH_4OH$ solutions through the column.

The tests were conducted on cobaltic solutions in which the Co:Ni ratio was approximately 3:1. Before using the resin, it is converted to the ammonia form by an upward flow through the glass column of 20 percent $NH_4OH$ solution. The cobaltic solution was then fed downwardly through the column, as were all the wash steps. The adsorption of the nickel was followed by a water wash and then a wash with a solution of 5 percent $(NH_4)_2SO_4$ and 1N $NH_4OH$. This removes entrained cobalt and nickel. Following an additional water wash, the nickel was then stripped or eluted with 4N $H_2SO_4$ solution. The elutriant remaining in the resin was removed by a water wash and the resin then regenerated to the ammonia form.

The results obtained on cobaltic solutions with CO:Ni ratios of 3:1 and 20.2:1, respectively, are given in Tables 4 and 5 as follows:

Table 4

Nickel Adsorption on Dowex XF-4045 Resin From Cobaltic Solutions With a CO/Ni Ratio of 3:1

| Test XF-2 | ml | Assayed,gpl | | Ratio | |
|---|---|---|---|---|---|
| | | Ni | Co | Ni/Co | Co/Ni |
| Feed Solution, pH 1.5 | 500 | 0.199 | 0.593 | | 3.0 |
| Effluent | 569 | 0.001 | 0.186 | | 186 |
| Wash | 2000 | 0.001 | 0.083 | | 83 |
| Effluent plus wash | 2569 | 0.001 | 0.106 | | 106 |
| Eluate | 610 | 0.150 | 0.038 | 3.9 | |
| Wash | 300 | 0.016 | 0.006 | 2.7 | |
| Eluate plus wash | 910 | 0.106 | 0.027 | 3.9 | |

Cumulative Ni Loaded >    97.0%
Cumulative Co Loaded      8.4%
lb Ni/Cu ft resin         0.020
lb Co/Cu ft resin         0.006

Table 5

Nickel Adsorption on Dowex XF-4045 Resin From Cobaltic Solutions With a Cobalt Nickel Ratio of 20.2:1

| Test XF-4 | ml | Assayed, gpl | | | Ratio | |
|---|---|---|---|---|---|---|
| | | Ni | Co | Cu | Ni/Co | Co/Ni |
| Feed Solution, pH 2.5 | 850 | 0.208 | 4.20 | 0.001 | | 20.2 |
| Effluent | 1000 | <0.001 | 2.660 | 0.0005 | | 2660 |
| Wash | 1940 | <0.001 | 0.409 | 0.0005 | | 409 |
| Effluent plus Wash | 2940 | <0.001 | 1.175 | 0.0005 | | 1175 |
| Eluate | 600 | 0.304 | 0.108 | 0.004 | 2.8 | |
| Wash | 500 | 0.026 | 0.017 | 0.0005 | 1.5 | |
| Eluate plus wash | 1100 | 0.178 | 0.066 | 0.002 | 2.7 | |

Cumulative Ni Loaded >    99.0%
Cumulative Co Loaded      3.2%
lb Ni/Cu ft resin         0.043
lb Co/Cu ft resin         0.013

The tables show that satisfactory separation of nickel is obtainable from the cobaltic solution. Assays showed that nickel in the cobalt effluent solutions was as low as 1 ppm, considering that the starting solution contained 208 ppm of nickel. Cobalt:nickel ratios as high as 1175:1 were obtained following the removal of nickel.

The flow rates in the tests through the adsorption column were about 1 gallon or less per minute per cubic foot of resin for both the loading and elution steps. Eluation of nickel from the resin using 4N $H_2SO_4$ was fast and complete.

Although the present invention has been described in conjunction with certain specific embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A method of separating nickel and cobalt from a mainstream nickel-cobalt solution containing nickelous and cobaltous ions, which comprises, providing a mainstream nickel-cobalt solution in which the nickel-to-cobalt ratio ranges from about 5:1 to about 200:1, removing an aliquot portion of said nickel-cobalt solution from said mainstream, said aliquot portion containing enough nickel which when oxidized to the nickelic state is at least sufficient to oxidize subsequently the cobalt in the mainstream solution to the cobaltic state, precipitating said nickel from said aliquot portion as a nickelous precipitate by the addition of a precipitating agent selected from the group consisting of a mixture of $CO_2$ and $NH_3$, and $NH_3$ alone, the temperature of precipitation with $NH_3$ alone used being over 50°C, oxidizing said nickelous precipitate to the nickelic state, separating said oxidized nickel precipitate from solution, contacting the mainstream solution with said oxidized precipitate for a time sufficient to oxidize cobaltous ions in said solution to the cobaltic state and thus precipitate the cobalt from solution and reduce the nickelic ion to the nickelous state, the temperature of oxidation being over 50°C, the cobaltic precipitate also containing nickel, and whereby the nickel in the mainstream solution is enriched substantially relative to the cobalt content, dissolving said cobaltic precipitate in an ammonium sulfate solution containing at least about 100 grams per liter of $(NH_4)_2SO_4$ and at least about 50 grams per liter of $NH_3$ at a temperature ranging from about 80°C to 120°C under a pressure of at least about 20 psi gage, acidifying said solution to a pH of about 1.5 to 3.0 and cooling said solution to produce a nickel-ammonium sulfate precipitate highly enriched in nickel, separating said precipitate from said solution which solution contains said cobalt and residual nickel, passing said solution through an ion exchange column selective to the removal of said residual nickel, thereby leaving a solution containing said cobalt substantially free of nickel, and then passing said solution to cobalt recovery.

2. The method of claim 1, wherein said cobaltic precipitate contains about 25 percent to 45 percent nickel and about 20 percent to 5 percent cobalt, wherein said solution for dissolving said cobalt precipitate contains 100 to 450 gpl $(NH_4)_2SO_4$, about 50 to 170 gpl $NH_3$ and is subjected to a pressure of about 20 to 30 psi gage.

3. A method of separating nickel and cobalt from a mainstream nickel-cobalt solution containing nickelous and cobaltous ions with the nickel-to-cobalt ratio ranging from about 5:1 to 200:1 which comprises, precipitating nickel from a nickel solution as a nickelous precipitate by the addition of a precipitating agent selected from the group consisting of a mixture of $CO_2$ and $NH_3$, and $NH_3$ alone, the temperature of precipitation with $NH_3$ alone used being over 50°C, the amount of nickel being such that when oxidized to the nickelic state it is at least sufficient to oxidize subsequently the cobalt in the mainstream solution to the cobaltic state, oxidizing said nickelous precipitate to the nickelic state, separating said oxidized nickel precipitate from solution, contacting the mainstream solution with said oxidized precipitate for a time sufficient to oxidize cobaltous ions in said solution to the cobaltic state and thus precipitate the cobalt from solution and reduce the nickelic ion to the nickelous state, the temperature of oxidation being over 50°C, the cobaltic precipitate also containing nickel, and whereby the nickel in the mainstream solution is enriched substantially relative to the cobalt content, dissolving said cobaltic precipitate in an ammonium sulfate solution containing at least about 100 grams per liter of $(NH_4)_2SO_4$ and at least about 50 grams per liter of $NH_3$ at a temperature ranging from about 80°C to 120°C under a pressure of at least about 20 psi gage, acidifying said solution to a pH of about 1.5 to 3.0 and cooling said solution to produce a nickel-ammonium sulfate precipitate highly enriched in nickel, separating said precipitate from said solution which solution contains said cobalt and residual nickel, passing said solution through an ion exchange column selective to the removal of said residual nickel, thereby leaving a solution containing said cobalt substantially free of nickel, and then passing said solution to cobalt recovery.

4. The method of claim 3, wherein said cobaltic precipitate contains about 25 percent to 45 percent nickel and 20 percent to 5 percent cobalt, wherein said solution for dissolving said cobalt precipitate contains 100 to 450 gpl $(NH_4)_2SO_4$, 50 to 170 gpl $NH_3$ and is subjected to a pressure ranging from about 20 to 30 psi gage.

* * * * *